United States Patent [19]

Hull

[11] 4,304,320
[45] Dec. 8, 1981

[54] MOVING BODY VELOCITY ARRESTING LINE

[75] Inventor: Reid A. Hull, Hampton, Va.

[73] Assignee: The United States of America as represented by the Administrator of the National Aeronautics and Space Administration, Washington, D.C.

[21] Appl. No.: 108,107

[22] Filed: Dec. 28, 1979

[51] Int. Cl.³ ............................................. F16D 63/00
[52] U.S. Cl. ..................................... 188/371; 57/906; 244/110 C; 280/805
[58] Field of Search ................... 188/1 C; 244/110 R, 244/110 C, 151 R, 151 A, 151 B; 280/805; 24/252 A; 57/202, 906

[56] References Cited

U.S. PATENT DOCUMENTS

| | | | |
|---|---|---|---|
| 2,275,019 | 3/1942 | Peterson | 57/906 X |
| 2,474,124 | 6/1949 | Schultz | 188/1 C |
| 3,074,760 | 1/1963 | Hodgekin | 188/1 C |
| 3,079,192 | 2/1963 | Ottey | 57/202 X |
| 3,217,838 | 11/1965 | Peterson et al. | 188/1C |
| 3,280,942 | 10/1966 | Millington | 188/1 C |
| 3,338,046 | 8/1967 | Baur et al. | 57/906 X |
| 3,530,959 | 9/1970 | Kopp | 188/1 C |
| 3,862,673 | 1/1975 | Benson | 188/1 C |

Primary Examiner—George E. A. Halvosa
Attorney, Agent, or Firm—Howard J. Osborn; John R. Manning; Wallace J. Nelson

[57] ABSTRACT

The invention consists of an improvement in the art of arresting a moving body through the use of steel cables that elongate to absorb the kinetic energy of the body. The improvement comprises a sleeve which surrounds the cables, protecting them from chafing and providing a failsafe energy absorbing system should the cables fail.

9 Claims, 2 Drawing Figures

U.S. Patent    Dec. 8, 1981    4,304,320
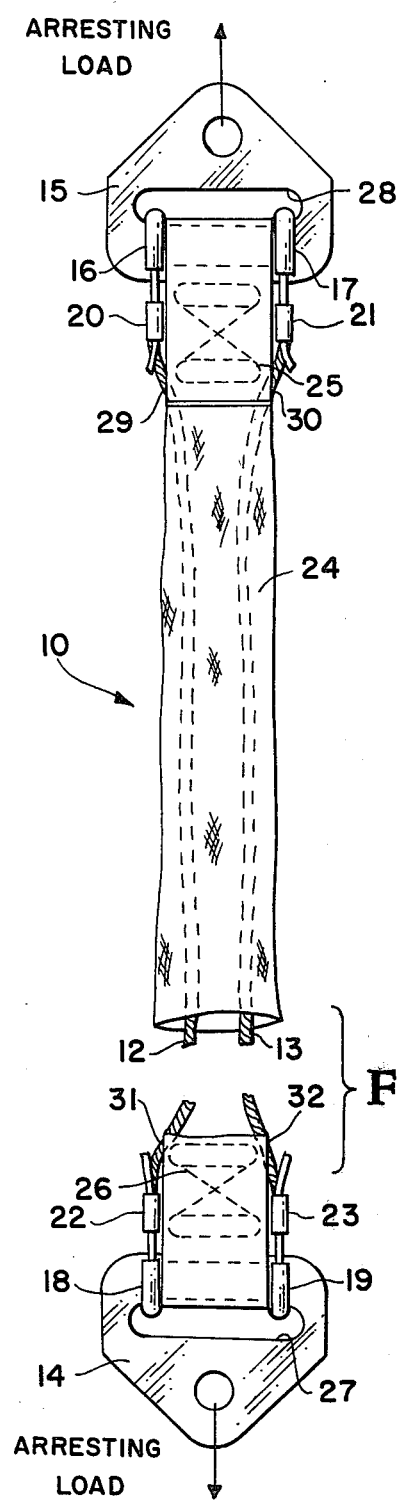
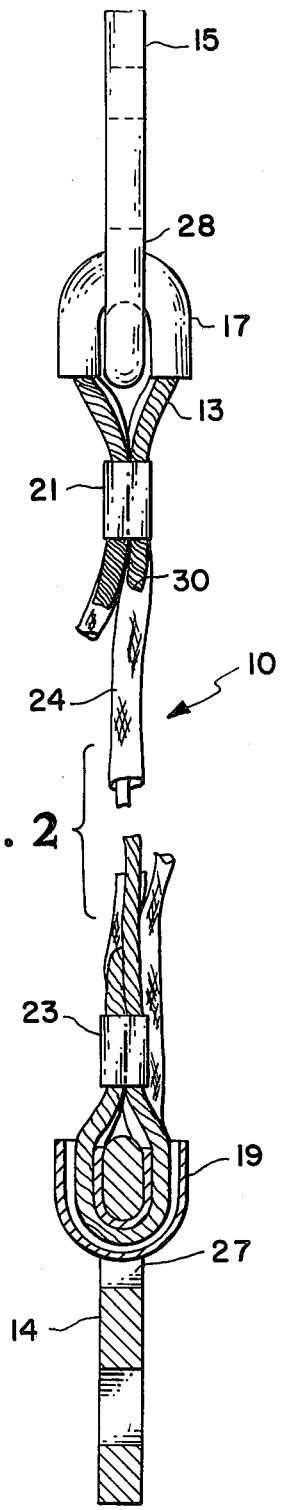
FIG. 1
FIG. 2

MOVING BODY VELOCITY ARRESTING LINE

ORIGIN OF THE INVENTION

The invention described herein was made by an employee of the United States Government and manufacturered and used by or for the Government for governmental purposes without the payment of any royalties thereon or therefore.

TECHNICAL FIELD OF THE INVENTION

The invention relates to the art of arresting velocity of a moving body. Specifically, the invention consists of an improvement in the use of an annealed cable to elongate thereby absorbing the energy of the moving body.

BACKGROUND OF THE INVENTION

Various devices have been used to arrest the motion of a body. Among those devices have been nets and elastic cords. A difficulty with these is that the elasticity of the cords or net causes a significant rebound which can be damaging to the object. This occurs because as the elastic member elongates it stores large amounts of the energy of the moving body. After elongation, the member rapidly contracts releasing the stored energy and reimparting it to the object. To overcome this problem metal cables have been used in place of elastic materials. The energy of the object is absorbed by the cable causing the cable to elongate. Unlike an elastic cord, the cable is permanently deformed so there is no rebound shock to the object. Annealed cables have been used to increase the elongation potential of the cable. U.S. Pat. No. 3,217,838 to Peterson et al discloses such a cable. A difficulty with annealed cables is that they must be handled with great care. Any chafing of the cable, especially during elongation, can cause the cable to fail before reaching its expected length.

It is therefore an object of the present invention to increase the reliability of an annealed cable arresting line by protecting such a line from chafing.

Another object of the present invention is to improve an arresting line by providing a failsafe protection in case the line fails.

These and other objects of the present invention together with the advantages attendant therewith will be readily apparent when the specification is taken in conjunction with the attached drawings to which it relates.

STATEMENT OF THE INVENTION

In accordance with the present invention, the annealed cable is routed through a tube which may be woven of dacron or similar filaments. This tube forms a sleeve which surrounds the cable. The sleeve is made longer than the cable so as to allow the cable to elongate and absorb the energy from the moving body. The sleeve is stitched to the cable anchors so as to afford failsafe protection. If the cable fails, the sleeve will absorb the remaining energy through its own elongation within design limitations.

DESCRIPTION OF THE DRAWINGS

FIG. 1 is a cutaway plan view showing the cable and sleeve; and

FIG. 2 is a side view showing how the cable is attached to its anchors;

DETAILED DESCRIPTION OF THE INVENTION

The invention can be understood best by referring to the drawings in which any particular numeral designates the same element throughout the figures.

Referring now to FIG. 1, there is shown an arrester designated generally by the reference numeral 10. Cables 12 and 13 extend from anchor 14 to anchor 15. Anchors 14 and 15 are metal shackles that are connected to the moving body and the restraining force, respectively. For example, the restraining force could be a parachute and the moving body an object dropped from an airplane. Cables 12 and 13 have been partially annealed to increase their elongation potential. Type 302 stainless steel cable cleaned and subjected to 1650° F. for fifteen minutes in a vacuum furnace was found to elongate as much as 40 percent with only a 50 percent loss in strength. Cables 12 and 13 are connected to anchors 14 and 15 via copper tube 16, 17, 18, and 19. Soft annealed copper tubing is used so that the cables do not chafe against the anchor which could cause failure of the cable. Swages 20, 21, 22 and 23 hold the cables in place. Swages are annealed and carefully fitted so as not to weaken the cable. In practice no failure of the cables was produced by these fittings. FIG. 2 gives a better view of the copper tubes and swage fittings.

Returning now to FIG. 1, sleeve 24 surrounds cables 12 and 13. Sleeve 24 may be a braided material, woven of dacron or similar filaments. Sleeve 24 is stitched together at end 25 and end 26 after passing through loops 27 and 28 in anchors 14 and 15. It is important that the stitching 25 be strong enough to enable the sleeve to develop its full strength. Holes 29 and 30 allow cables 12 and 13 to emerge from sleeve 24 before they are attached to anchor 15. Similar holes 31 and 32 in the other end of the sleeve 24 allow the cables to be attached by anchor 14. Sleeve 24 is approximately 30 percent longer than cables 12 and 13 in order to allow the cables to elongate without the sleeve absorbing the energy. The sleeve is crumpled to enable it to fit between the anchors.

In operation, the cables 12 and 13 absorb the energy of a moving body at a nearly constant rate as they elongate. This markedly reduces the maximum arresting load experienced compared with that experienced in an elastic arresting system. Recoil of the line is also greatly diminished. Once the line has elongated 30 percent, absorbing most of the body's energy, sleeve 24 is pulled taut. The negligible amount of energy remaining in the body is absorbed by sleeve 24. Additionally, if one of the cables fails, the sleeve serves as a backup energy absorber elongating up to 20 percent of its length while being capable of absorbing up to 50 percent of the kinetic energy from the moving body. The sleeve also protects the cable from chafing against adjacent objects during elongation. An unprotected cable would break if subjected to chafing during elongation. It is also important that all the components of the system be made of nondeteriorating and noncorrosive type materials since they involve safety applications and also may entail a relatively long shelf life. Materials such as stainless steel, copper and dacron meet these requirements.

The invention can be used in connection with any kinetic energy absorbing system. For example, some of the uses to which the invention could be put include safety restraints on emergency vehicles, nondestructive freefall testing, shroud lines on parachutes, and ground snatch by a fixed wing aircraft.

It is understood that the foregoing description is a particular embodiment of the invention and is therefore merely representative. For instance, the novel sleeve could be placed around a plastic line instead of a steel cable and would still provide the failsafe energy absorbing system and protect the line. Obviously there are other variations and modifications of the present invention in light of the above teachings. It is therefore understood that within the scope of the appended claims the invention may be practiced otherwise than as specifically described.

What is claimed as new and desired to be secured by Letters Patent of the United States is:

1. A device for arresting the velocity of a moving object comprising:
   energy absorbing means for absorbing the kinetic energy of a moving object by elongating, said energy absorbing means being attached at opposite ends to an anchor means; and
   sleeve means loosely surrounding said energy absorbing means at least in the non-elongated condition of said energy absorbing means for protecting said energy absorbing means from chafing, and for providing a failsafe in case of failure of said energy absorbing means, said sleeve means being anchored to said anchor means at ends corresponding to ends of said energy absorbing means under all conditions of operation.

2. A device as in claim 1 wherein said sleeve means is a braided material woven of filaments into a tube approximately 30 percent longer than said energy absorbing means, said energy absorbing means being routed through said tube.

3. A device as in claim 2 wherein said energy absorbing means comprises at least one annealed metal cable.

4. A device as in claim 3 wherein said energy absorbing means is a pair of steel cables, said steel cables being looped through said anchor means; and
   tubing means surrounding the steel cables at the point of contact with the anchors to prevent chafing.

5. A device as in claim 4 wherein the tubing means is annealed copper.

6. A device as in claim 4 wherein the ends of the steel cables are attached to the steel cables after being looped through the anchors by swages fitted and clamped so as not to weaken the cables.

7. A device as in claim 4 wherein said sleeve means has ends thereof looped through said anchor means; the ends of said sleeve means spacing said steel cables to prevent chafing.

8. A device as in claim 2 wherein said energy absorbing means comprises a plastic line.

9. A device as in claim 2 wherein the sleeve means is dacron.

* * * * *